(12) United States Patent
Matzner

(10) Patent No.: US 7,451,959 B2
(45) Date of Patent: Nov. 18, 2008

(54) PLUG VALVE HAVING A SEAL BOSS

(75) Inventor: Mark D. Matzner, Burleson, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 45 days.

(21) Appl. No.: 11/638,965

(22) Filed: Dec. 14, 2006

(65) Prior Publication Data

US 2008/0142752 A1      Jun. 19, 2008

(51) Int. Cl.
*F16K 5/04* (2006.01)
(52) U.S. Cl. .................. 251/192; 251/309; 251/317
(58) Field of Classification Search ........... 251/172, 251/175, 192, 309, 317; 137/375
See application file for complete search history.

(56) References Cited

U.S. PATENT DOCUMENTS

| | | | | |
|---|---|---|---|---|
| 3,072,379 A | | 1/1963 | Hamer | |
| 3,346,002 A | * | 10/1967 | Thompson, Jr. et al. | 251/174 |
| 3,357,679 A | * | 12/1967 | Gulick | 251/172 |
| 3,425,661 A | * | 2/1969 | Mayo | 251/175 |
| 3,439,897 A | * | 4/1969 | Priese et al. | 251/170 |
| 3,455,534 A | * | 7/1969 | Scaramucci | 251/175 |
| 3,556,474 A | * | 1/1971 | Scaramucci | 251/172 |
| 3,561,727 A | * | 2/1971 | Scaramucci | 251/172 |
| 3,630,483 A | | 12/1971 | Canalizo | |
| 3,712,585 A | * | 1/1973 | Grenier | 251/174 |
| 3,840,048 A | * | 10/1974 | Moen | 251/172 |
| 3,894,718 A | * | 7/1975 | Koch et al. | 251/172 |
| 4,113,228 A | * | 9/1978 | Frye | 251/172 |
| 4,254,793 A | * | 3/1981 | Scaramucci | 251/172 |
| 4,332,370 A | | 6/1982 | Williams | |
| 4,506,696 A | * | 3/1985 | von Pechmann | 251/309 |
| 6,082,707 A | * | 7/2000 | Hosie et al. | 251/172 |
| 6,554,249 B2 | * | 4/2003 | Pang et al. | 251/174 |

FOREIGN PATENT DOCUMENTS

DE           1166571 B      3/1964

* cited by examiner

*Primary Examiner*—John Bastianelli
(74) *Attorney, Agent, or Firm*—Bracewell & Giuliani LLP

(57) ABSTRACT

A fluid control valve utilizes a rotatable plug valve member mounted in a fluid passage to control the flow of fluids. Two segments are placed on each side of the plug valve member within a recess located between the plug valve member and the body of the fluid passage. The outer surface of the segments includes an elastomeric seal and metal annular boss, which acts as a stop to limit deformation of the seal when the valve is closed and under pressure.

17 Claims, 3 Drawing Sheets

PLUG VALVE HAVING A SEAL BOSS

BACKGROUND

1. Field of the Invention

This invention relates in general to fluid control valves, such as used in oilfield workover applications and in particular to a plug valve having a metal-to-metal seal between a rotatable plug and a sealing segments.

2. Description of the Prior Art

In fluid control valves of the plug type, a rotatable, cylindrical plug with a transverse hole is mounted in a transverse opening of the fluid flow valve body. The rotation of the plug is achieved through the use of a rotatable stem, which allows the valve to move between a closed position, in which the plug valve prevents fluid flow through the flow passage, and an open position, in which the plug valve allows the fluid to flow.

The plug is sealed by a pair of semi-cylindrical segments, which are placed in recesses formed between the transverse opening and the flow passages. Each segment has a hole that registers with one of the flow passages and is located between the plug valve and one of the flow passages. A metal-to-metal seal is formed between the inner side of each segment and the plug. An elastomeric seal seals the outer side of each segment to the recess and exerts an inward force on the segment to cause the metal-to-metal sealing. The practice, however, has proven to be as much an art as it is a science because the segments must be formed nearly perfectly in order to sufficiently form a metal-to-metal seal. Because of tolerances, the plug may shift slightly from the open to the closed position. As such, manufacturers must spend extra time and money to achieve an exact fit.

SUMMARY OF THE INVENTION

The fluid control valve of the present invention utilizes a rotatable plug valve member mounted in a fluid passage to control the flow of fluids. Two segments are placed on each side of the plug valve member within a recess located between the plug valve member and the body of the fluid passage. The outer surface of the segments includes an elastomeric seal and a metal annular boss. The elastomeric seal seals against the recess and exerts an inward force to enhance metal-to-metal sealing of the inner side of the segment with the plug. The annular boss contacts the recess to limit the deformation of the elastomeric seal within its groove.

The thickness of the boss is selected to provide a desired metal-to-metal contact of the plug with the segment. The boss may comprise one or more shims, or it may comprise plating. Preferably the boss is located at the edge of the hole through the segment. The elastomeric seal preferably surrounds the boss.

DETAILED DESCRIPTION OF THE INVENTION

Figure 1:
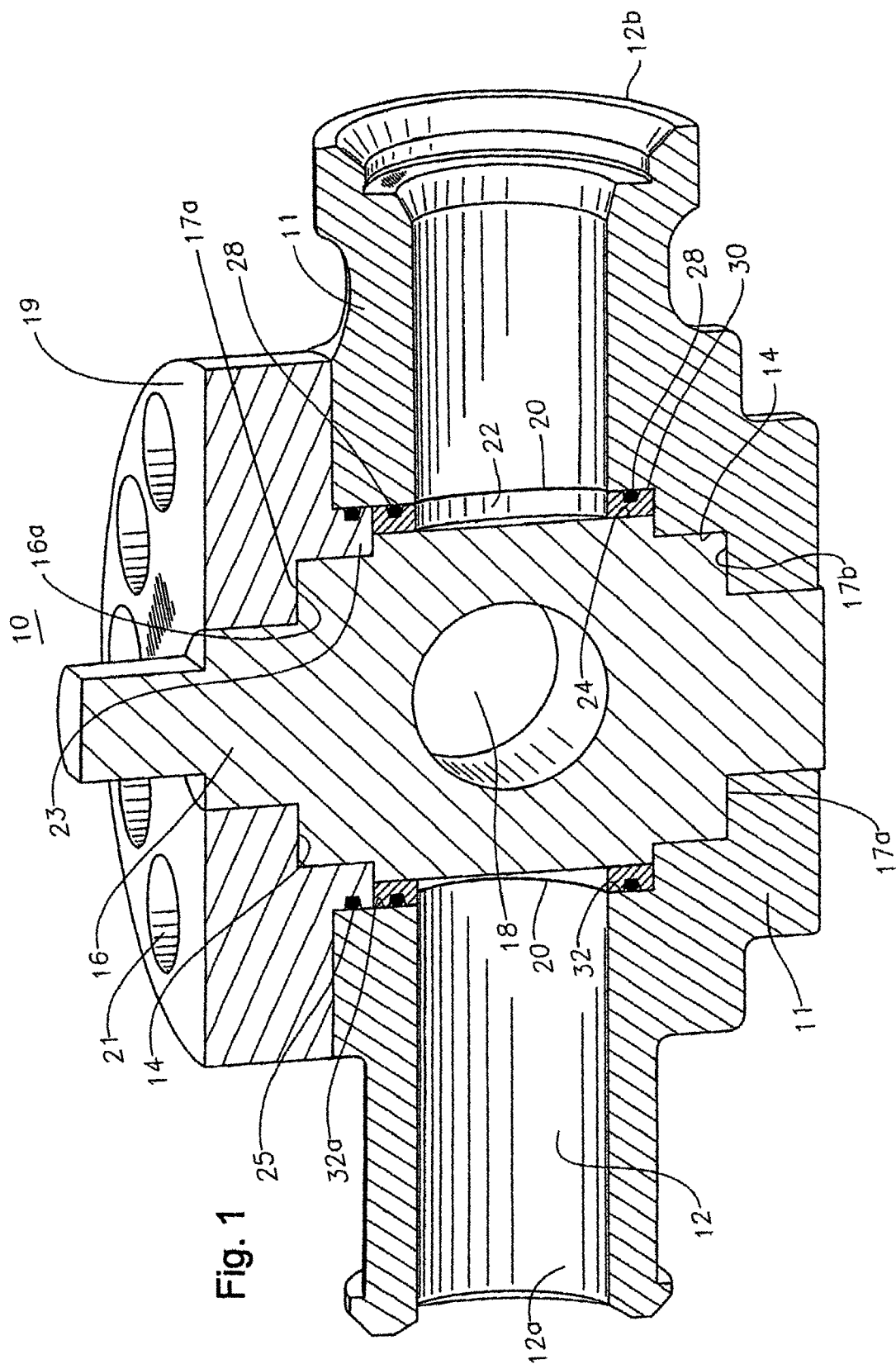
FIG. 1. is a sectional view of plug valve according to an embodiment of the present invention.

Referring to FIG. 1, a fluid control valve according to an embodiment of the present invention is illustrated. Fluid control valve 10 includes a housing 11 having a flow passage 12 extending therethrough, which allows various fluids to be transported. Flow passage 12 has two separate portions 12a and 12b, each of which may be an inlet or an outlet. For convenience, portion 12a is considered to be an upstream portion or inlet and portion 12b a downstream portion or outlet. Flow passage 12 is typically cylindrical.

Housing 11 contains a stepped cylindrical cavity 14 with an axis perpendicular to the axis of flow passage 12. Flow passage portions 12a, 12b intersect cavity 14. A cylindrical rotatable plug 16 fits within cavity 14. Plug 16 has a cylindrical passage 18 extending through it perpendicular to the axis of plug 16. Plug 16 is a 90 degree "ON/OFF" device, which can be rotated along its axis between an open position, wherein passage 18 aligns with flow passage 12, and a closed position (shown in FIG. 1), wherein passage 18 is perpendicular to flow passage 12. Such rotation can be achieved through a power mechanism or manually rotated by a worker in the field.

Plug 16 has a flat, annular shoulder 17a on its lower portion that engages an annular shoulder 17b in housing 11. Plug valve 16 also has a flat annular shoulder 17a on its upper portion. In order to secure plug valve 16 within housing 11, a cap 19 is placed on top of plug valve 16 and secured to housing 11. Cap 19 has an annular shoulder 16a on its lower portion that engages shoulder 17a on the upper portion of plug valve 16.

Cap 19 also includes a plurality of bolt holes 21 cylindrically spaced around it and extending through its axis. Housing 11 includes threaded bolt holes (not shown), which allow bolts to be screwed into bolt holes 21 of cap 19 and connected into housing 11. Cap 19 has a cylindrical neck 23 that fits closely within the upper end of cylindrical cavity 14. A circular elastomeric cap seal 25 encircles neck 23 and seals between neck 23 and housing 11.

Figure 3:
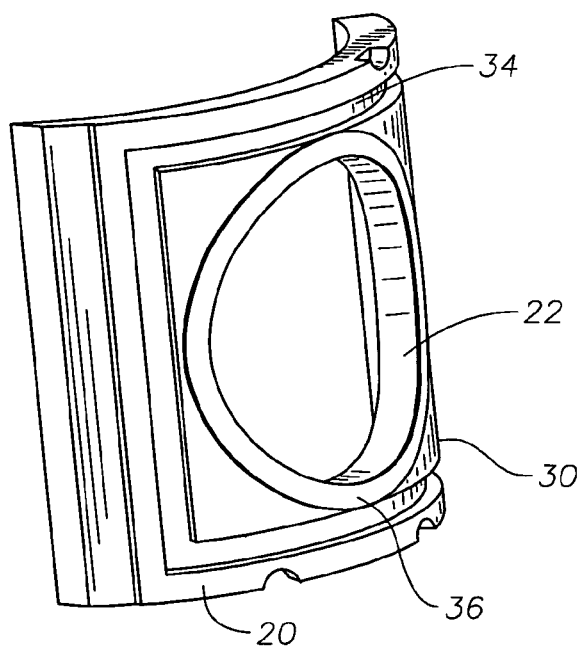
FIG. 3 is a perspective view of a segment having an alternate embodiment of a boss, the boss being formed directly on the segment.
Figure 4:
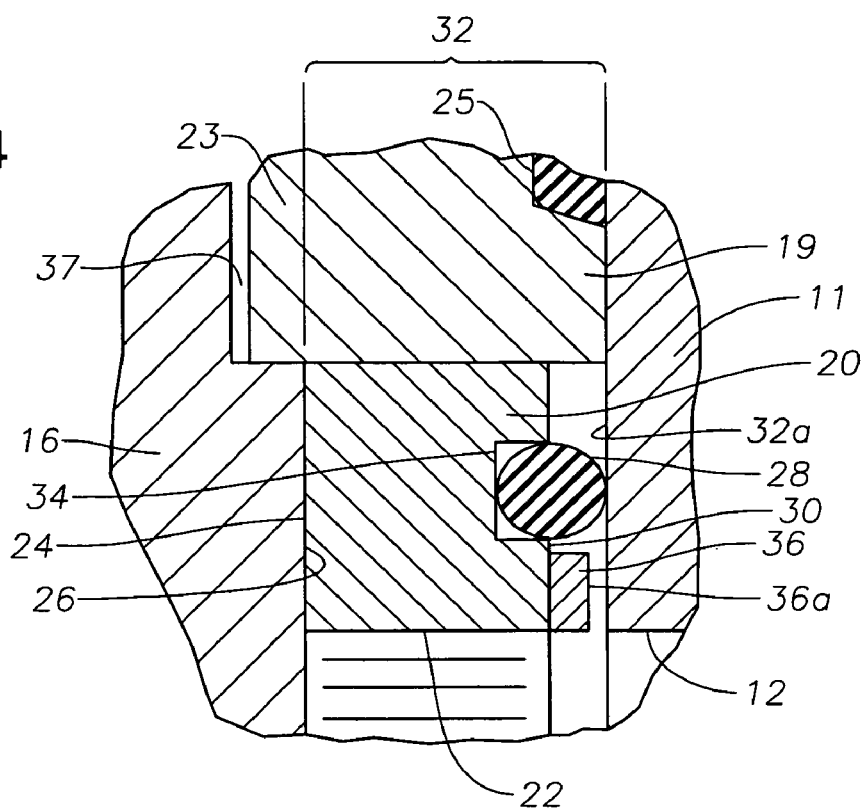
FIG. 4 is an enlarged and exaggerated sectional view of a portion of the plug valve of FIG. 2, shown with the plug in an open position.
Figure 5:
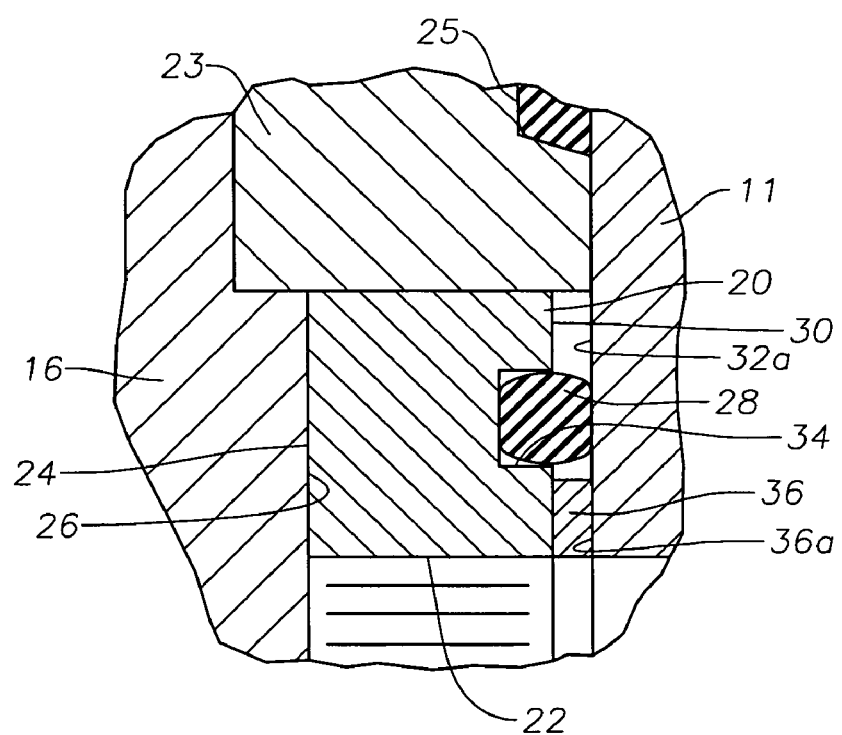
FIG. 5 is an enlarged sectional view of the portion of the plug valve shown in FIG. 4, but with the plug shown in a closed position.

A recess 32 is located between each flow passage portion 12a and plug 16. Each recess 32 is partially cylindrical and located at the junction of one of the flow passage portions 12a and plug cavity 14. A partially cylindrical segment 20 is placed within each recess 32 between plug 16 and housing 11. As shown also in FIG. 3, each segment 20 is a curved plate having upper and lower edges that are parallel to each other and side edges that are parallel to each other and perpendicular to the upper and lower edges. Each segment 20 forms part of a cylinder but need not extend a full 180 degrees. Plug 16 has a metal sealing surface 24 that forms a metal-to-metal seal with an inner wall surface 26 of each segment 20 (as shown in FIGS. 4 & 5). Segments 20 are stationary and do not move when plug valve 16 is rotated. Each segment 20 has a circular hole 22 extending therethrough that aligns with passage 18 of plug valve 16 when in its open position.

Figure 2:
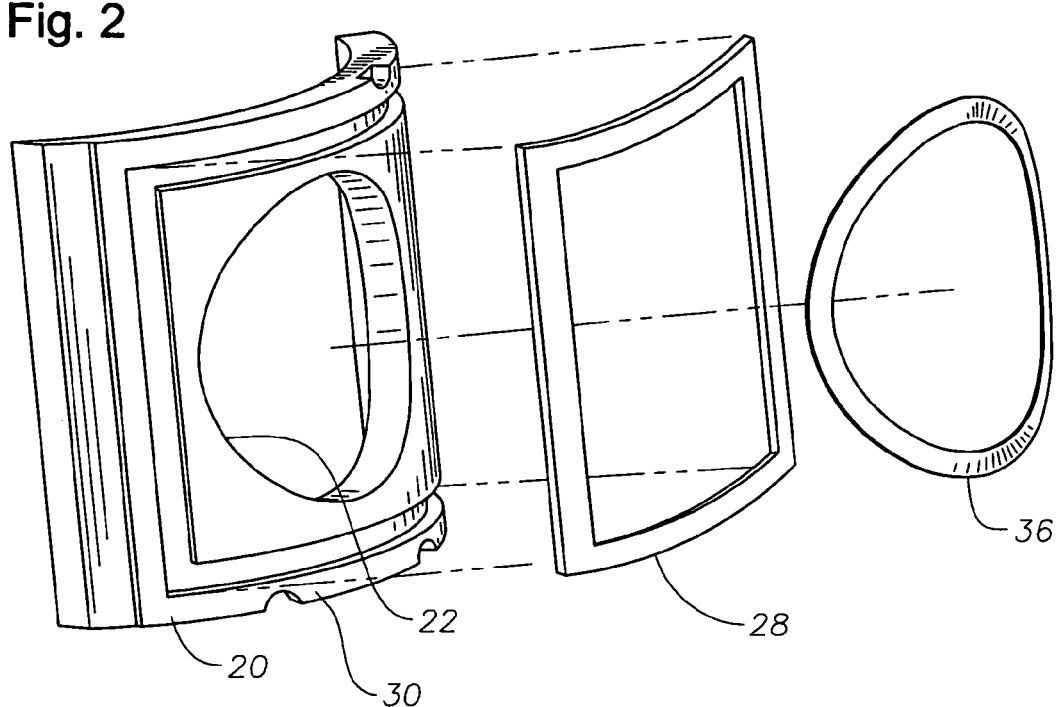
FIG. 2 is an exploded perspective view of a segment and an annular shim or boss according to an embodiment of the present invention.

In an exemplary embodiment of the present invention, an elastomeric sealing member 28 is placed in a groove 34 on an outer wall surface 30 of each segment 20 as shown in FIG. 2. Each groove 34 and each seal member 28 are shown to be rectangular, but they could be circular. A rigid annular boss 36 is also located on outer wall surface 30 of segment 20 surrounding hole 22. Boss 36 is preferably circular and located at the edge of hole 22 and surrounded by seal member 28. Boss 36 is preferably metal and can be made of any suitable material. Boss 36 may comprise one or more thin metal shims, as shown in FIG. 2 or a plating formed on segment outer wall surface 30, as illustrated in FIG. 4.

Referring to FIG. 4, boss 36 preferably has a face 36a that is initially spaced from housing 11 at the base 32a of recess 32 when plug 16 is open or when there is minimal fluid pressure in flow passage 12. In the example shown, face 36a appears flat, in cross-section however face 36a curves about the axis of plug 16 to match the partially cylindrical outer wall surface 30 of segment 20. Face 36a preferably does not form a metal seal with base 32a because sealing is accomplished by elastomeric seal 28. Face 36a of boss 36 protrudes outward from segment outer wall surface 30 less than the normal protrusion of elastomeric seal 28 from its groove 34 when plug 16 is open or under minimal pressure. Elastomeric seal 28 protrudes from groove 34 and deforms against recess base 32a of housing 11 to form a seal when plug 16 is open or under minimal pressure, and also when under high pressure and closed. Boss 36 will normally not contact recess base 32a of housing 11 as shown in FIG. 5 unless plug 16 is closed and sufficient fluid pressure is present in upstream flow passage 12a. In one example, boss 36 extends 0.002" (inches) to 0.003" (inches) from outer surface 30 of segment 20. However, shorter or longer extension lengths can be envisioned and used within the scope of this invention.

Referring to FIG. 1, during operation, when plug 16 is in the open position, the axis of plug 16 will coincide with the axis of cavity 14. When closed, and if the pressure in flow passage upstream portion 12a is sufficiently high, it will push plug 16 slightly in the downstream direction, causing the axis of plug 16 to shift laterally slightly relative to the axis of cavity 14. FIG. 4 illustrates plug 16 when opened, showing an exaggerated clearance 37 between 36 between plug 16 at the wall portion of cavity 14 within cap 19. Clearance 37 will exist both on the upstream and the downstream segments 20. Each elastomeric seal 28 will be deformed normally into sealing engagement with housing 11 at base 32a of recess 32. Boss face 36a will not be in contact with housing 11 when plug 16 is open. The inner wall surface 24 of both the upstream and downstream segments 20 will be in metal-to-metal contact with plug seal surface 26.

When plug valve 16 is in its closed position, and the pressure on the upstream portion 12a of flow passage 12 is sufficiently high, fluid pressure from the upstream portion 12a of flow passage 12 is exerted on plug 16, which in turn, shifts slightly and forces segment 20 to move toward housing 11 as shown in FIG. 5. As such, elastomeric seal 28 on the downstream segment 20 is deformed more and elastomeric seal 28 on the upstream segment 20 is deformed less. If the pressure is high enough, flat surface 36a of boss 36 on downstream segment 20 engages with housing 11 at base 32a of recess 32. Elastomeric seal 28 will still continue to protrude past segment outer wall surface 30 when boss 36 is in contact with base 32a, as shown in FIG. 5.

The engagement of boss 36 with housing 11 creates a reactive force that passes through the downstream segment 20 and is exerted on the downstream side of plug valve 16, enhancing the metal-to-metal sealing engagement. The reactive force acts on the annular area surrounding the downstream end of plug passage 18. Once fluid pressure is relieved, the elastomeric nature of member 28 forces segment 20 back into the normal position of FIG. 4. While under pressure and closed, elastomeric seal 28 of the upstream segment 20 will still be in sealing engagement with base 32a of recess 32. When plug valve 16 is again opened, elastomeric seal 28 on the downstream segment 20 will push the downstream segment 20 in an upstream direction so that boss 36 moves back away from base 32a to the position shown in FIG. 4.

This invention has significant advantages. The plug valve has improved metal-to-metal sealing ability at high pressures. The system loading between the plug valve and the segments is concentrated into a small donut shaped zone surrounding the segment hole. As such, the system is less sensitive to leakage that occurs as pressure increases.

While this invention has been shown in only one of its forms, it should be apparent to those skilled in the art that it is not so limited but is susceptible to various changes without departing from the spirit and scope of the invention. For example, the boss is shown on both of the segments because the valve shown is bi-directional. If the valve was intended to be uni-directional, the same segment would always be the downstream segment, and the upstream segment would not require a boss.

The invention claimed is:

1. A fluid control valve comprising:
   a body having a flow passage therethrough and a transverse opening therein;
   a rotatable plug valve member mounted in the transverse opening for rotation about an axis, the rotatable plug valve member having a port therethrough and being capable of movement between a closed position in which the rotatable plug valve member prevents fluid flow through the flow passage and an opened position in which the port aligns with the flow passage;
   a recess in the body located at an intersection of the flow passage and the rotatable plug valve member;
   a segment located within the recess, the segments having an inner wall surface in sealing contact with the rotatable plug valve member and an outer wall surface, the segment having a hole whose axis aligns with the flow passage;
   a channel located on the outer wall surface of the segment, the channel having two sides and a bottom;
   an elastomeric seal located within the channel, the elastomeric seal in sealing engagement with a base of the recess; and
   a rigid boss protruding towards the base of the recess from the outer wall surface of the segment adjacent to one side of the channel and adjacent to the hole for contact with the base of the recess adjacent to the point where the elastomeric seal contacts the base of the recess.

2. The fluid control valve of claim 1, wherein the boss comprises a shim.

3. The fluid control valve of claim 1, wherein the boss comprises a coating formed on the segment.

4. The fluid control valve of claim 1, wherein the inner wall surface of the segment and the plug valve member form a metal-to-metal seal.

5. The fluid control valve of claim 1, wherein the boss has a face that is normally spaced from the base of the recess, but which contacts the base of the recess if sufficient fluid pressure exists when the valve is closed.

6. The fluid control valve of claim 1, wherein the boss is annular and encircles the hole in the segment.

7. The fluid control valve of claim 1, wherein the boss is formed of metal.

8. The fluid control valve of claim 1, wherein:
   when the plug valve member is in the opened position, the elastomeric seal is deformed into sealing engagement with the base of the recess, and the boss is spaced from the base of the recess by a clearance; and
   the thickness of the boss is selected so that under a selected pressure in the flow passage with the plug valve member in the closed position, the boss contacts the base of one of the recess and the elastomeric seal further deforms but still protrudes from the channel.

9. The fluid control valve of claim 1, wherein the elastomeric seal is located a greater distance away from the axis of the hole than the boss.

10. The fluid control valve of claim 1, wherein the inner wall surface of each segment forms a portion of a cylinder.

11. A fluid control valve comprising:
  a body having a flow passage therethrough and a transverse opening therein;
  a rotatable plug valve member mounted in the transverse opening for rotation about an axis, the rotatable plug valve member having a port therethrough and being capable of movement between a closed position in which the rotatable plug valve member prevents fluid flow through the flow passage and an opened position in which the port of the rotatable plug valve member aligns with the flow passage;
  a pair of recesses, each located in the flow passage between the rotatable plug valve member and the body;
  two partially cylindrical segments, each located within one of the recesses and having an inner wall surface in contact with the rotatable plug valve member and an outer wall surface adjacent a base of the recess, each segment having a hole whose axis aligns with the flow passage;
  a channel located on the outer wall surface of each segment, the channel having two sides and a bottom and surrounding the hole of the segment on which it is located;
  a metal annular boss adjacent to the channel, protruding from the outer wall surface of each of the segments towards the base of the recess and surrounding one of the holes, each of the bosses having a face spaced from contact with the base of one of the recesses when the plug valve member is in the opened position;
  an elastomeric seal located in the channel on the outer wall surface of each of the segments, each elastomeric seal being located a greater distance from an axis of the hole than the boss and in sealing engagement with the base of one of the recesses; and
  the protrusion of each boss being selected such that when under a selected fluid pressure acting on the plug valve member while in the closed position, a downstream one of the elastomeric seals deforms further into its channel and the face of a downstream one of the bosses contacts the base of the recess to limit the deformation of the downstream one of the elastomeric seals.

12. The fluid control valve of claim 11, wherein each of the bosses comprises a shim.

13. The fluid control valve of claim 11, wherein each of the bosses comprises a coating formed on one of the segments.

14. The fluid control valve of claim 11, wherein each of the faces of each of the bosses protrudes from the outer surface of one of the segments a distance in the range of 0.002 inches to 0.003 inches.

15. The fluid control valve of claim 11, wherein the inner wall surface of a downstream one of the segments forms a metal-to-metal seal with the plug valve member.

16. A method of controlling the flow of fluid through a conduit, the method comprising the steps of:
  (a) connecting a plug valve into the conduit, the valve comprising a rotatable plug valve member located within a transverse cavity of a body, a downstream segment having an inner wall surface in contact with the rotatable plug valve member, a hole therethrough and an outer wall surface, an elastomeric seal deformed within a channel made up of a bottom and two sides located on the outer wall surface surrounding the hole, the elastomeric seal being in sealing engagement between the outer wall surface and a portion of the body, and a boss located on the outer wall surface of the segments adjacent to the channel;
  (b) applying fluid pressure to the plug valve and moving the plug valve member to a closed position, causing a downstream directed force due to the fluid pressure to push the downstream segment in a downstream direction, further deforming the elastomeric seal against the body and causing the boss to contact the body to stop movement of the downstream segment; then,
  (c) opening the plug valve member, thereby causing the elastomeric seal to push the downstream segment in an upstream direction and moving the boss from contact with the body.

17. The method according to claim 16, wherein step (b) further comprises forming a metal-to-metal seal between the inner wall surface of the downstream segment and the plug valve member.

* * * * *